United States Patent
AbiEzzi et al.

(10) Patent No.: US 11,075,976 B2
(45) Date of Patent: Jul. 27, 2021

(54) REMOTING APPLICATION USER INTERFACES

(71) Applicant: VMware, Inc., Palo Alto, CA (US)

(72) Inventors: Salim AbiEzzi, Sammamish, WA (US); Osten Kit Colbert, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 399 days.

(21) Appl. No.: 14/582,623

(22) Filed: Dec. 24, 2014

(65) Prior Publication Data
US 2016/0191604 A1    Jun. 30, 2016

(51) Int. Cl.
*G06F 3/0484*     (2013.01)
*H04L 29/08*      (2006.01)
*H04L 29/06*      (2006.01)
*G06F 9/451*      (2018.01)

(52) U.S. Cl.
CPC ............ *H04L 67/025* (2013.01); *G06F 9/452* (2018.02); *H04L 67/02* (2013.01); *H04L 67/306* (2013.01); *H04L 67/42* (2013.01)

(58) Field of Classification Search
CPC ............... G06F 17/2247; G06F 17/218; G06F 17/2725; G06F 17/227; G06F 17/211; G06F 9/452; H04L 67/025; H04L 67/02; H04L 67/42; H04L 67/306
See application file for complete search history.

(56) References Cited

U.S. PATENT DOCUMENTS 7,149,776 B1 *  12/2006  Roy .................. G06F 17/30873
                                          707/E17.111
8,473,958 B2    6/2013   Kannay et al.
8,924,862 B1 *  12/2014  Luo ........................ G06F 9/543
                                          715/751

(Continued)

FOREIGN PATENT DOCUMENTS

JP    2005-075314    3/2005
JP    2010-026104    2/2010

(Continued)

OTHER PUBLICATIONS

U.S. Appl. No. 15/172,946, filed Jun. 3, 2016, AbiEzzi et al.

(Continued)

*Primary Examiner* — Stephen S Hong
*Assistant Examiner* — Ahmed I Nazar
(74) *Attorney, Agent, or Firm* — Fish & Richardson P.C.

(57) ABSTRACT

Systems and techniques are described for remoting application user interfaces. One of the techniques includes receiving a first user request to access an application from a first user device, wherein the application comprises a respective user interface code path corresponding to each of a plurality of user device classes, and wherein each user interface code path, when executed, generates a user interface that is specific to user devices of the corresponding user device class; classifying the first user device into a first user device class of the plurality of user device classes; causing the application to generate a user interface by executing a first user interface code path corresponding to the first user device class; and providing the user interface for presentation on the first user device in response to the first user request.

20 Claims, 4 Drawing Sheets

(56) References Cited

U.S. PATENT DOCUMENTS

| | | | |
|---|---|---|---|
| 8,970,492 | B2 | 3/2015 | Butner |
| 9,158,434 | B2 | 10/2015 | Beveridge |
| 9,167,020 | B2 | 10/2015 | Abdo et al. |
| 9,295,915 | B2 | 3/2016 | Bruno, Jr. et al. |
| 9,565,227 | B1 | 2/2017 | Helter et al. |
| 9,628,332 | B2 | 4/2017 | Bruno, Jr. |
| 2004/0010622 | A1 | 1/2004 | O'Neill |
| 2006/0075106 | A1 | 4/2006 | Hochmuth et al. |
| 2007/0179955 | A1* | 8/2007 | Croft .......... H04L 63/10 |
| 2007/0208808 | A1* | 9/2007 | Rust .......... G06Q 10/10 709/204 |
| 2009/0112808 | A1* | 4/2009 | Howcroft .......... G06F 17/30038 |
| 2009/0201847 | A1 | 8/2009 | Yabo et al. |
| 2009/0235177 | A1 | 9/2009 | Saul et al. |
| 2010/0106798 | A1 | 4/2010 | Barretto et al. |
| 2010/0135296 | A1 | 6/2010 | Hwang |
| 2010/0169790 | A1* | 7/2010 | Vaughan .......... G06F 3/0481 715/740 |
| 2010/0269046 | A1* | 10/2010 | Pahlavan .......... G06F 3/1462 715/740 |
| 2010/0306642 | A1* | 12/2010 | Lowet .......... G06F 17/30873 715/234 |
| 2011/0138295 | A1 | 6/2011 | Monnchilov et al. |
| 2011/0246891 | A1 | 10/2011 | Schubert |
| 2011/0295974 | A1 | 12/2011 | Kashef |
| 2012/0204093 | A1* | 8/2012 | Habarakada .......... G06F 17/30893 715/234 |
| 2012/0324358 | A1* | 12/2012 | Jooste .......... G06F 9/54 715/733 |
| 2013/0086212 | A1 | 4/2013 | MacInnis |
| 2013/0097488 | A1* | 4/2013 | Coman .......... G06F 16/9577 715/243 |
| 2013/0290856 | A1* | 10/2013 | Beveridge .......... G06F 9/452 715/740 |
| 2013/0290858 | A1 | 10/2013 | Beveridge |
| 2013/0346564 | A1 | 12/2013 | Warrick |
| 2014/0026057 | A1* | 1/2014 | Kimpton .......... G06F 9/451 715/733 |
| 2014/0215457 | A1* | 7/2014 | Gava .......... G06F 8/61 717/178 |
| 2014/0258872 | A1 | 9/2014 | Spracklen |
| 2014/0316990 | A1 | 10/2014 | Winston |
| 2014/0325374 | A1* | 10/2014 | Dabrowski .......... G06F 9/4443 715/744 |
| 2014/0344332 | A1 | 11/2014 | Giebler et al. |
| 2014/0355189 | A1 | 12/2014 | Nakano |
| 2015/0062183 | A1 | 3/2015 | Hong |
| 2015/0089426 | A1 | 3/2015 | Ukai |
| 2015/0134840 | A1 | 5/2015 | Thompson et al. |
| 2015/0172760 | A1 | 6/2015 | AbiEzzi et al. |
| 2015/0199308 | A1* | 7/2015 | Cooper .......... H04L 65/403 715/235 |
| 2016/0044088 | A1 | 2/2016 | Momchilov et al. |
| 2016/0246560 | A1 | 8/2016 | Petrov |
| 2016/0249006 | A1 | 8/2016 | Park et al. |
| 2017/0185438 | A1 | 6/2017 | Thomas et al. |
| 2017/0300966 | A1 | 10/2017 | Dereszynski et al. |
| 2020/0045097 | A1 | 2/2020 | AbiEzzi et al. |

FOREIGN PATENT DOCUMENTS

| | | |
|---|---|---|
| JP | 2010-126092 | 6/2010 |
| JP | 5994659 | 9/2016 |
| WO | WO 2013/168368 | 11/2013 |

OTHER PUBLICATIONS

U.S. Appl. No. 15/191,927, filed Jun. 24, 2016, AbiEzzi et al.
Write Once, Run Anywhere. Wikipedia, The Free Encyclopedia. Last updated Nov. 20, 2015. Retrieved Apr. 5, 2016. Retrieved from the Internet: URL<https://en.wikipedia.org/wiki/Write_once,_run_anywhere>. 2 pages.
Gear, David Pierce. Surface Book is the Laptop Microsoft Needed Years Ago. Wired. Published Oct. 6, 2015. Retrieved Feb. 5, 2016. Retrieved from the Internet: URL<http://www.wired.com/2015/10/surface-book-future-of-windows/>. 10 pages.
Massey, Sean P. Horizon View 5.3 Part 13—VMware Blast. The Virtual Horizon. Publication Feb. 25, 2014. Retrieved Feb. 5, 2016. Retrieved from the Internet: URL<https://thevirtualhorizon.com/2014/02/25/horizon-view-5-3-part-13-vmware-blast/>. 9 pages.
Device Driver. Wikipedia, The Free Encyclopedia. Last updated Mar. 29, 2016. Retrieved Apr. 5, 2016. Retrieved from the Internet: URL<https://en.wikipedia.org/wiki/Device_driver>. 7 pages.
International Search Report and Written Opinion in International Application No. PCT/JP2013/002600, dated Jun. 11, 2013, 17 pages (English Translation).

* cited by examiner

REMOTING APPLICATION USER INTERFACES

BACKGROUND

This document relates to remoting application user interfaces to user devices.

A user of a user device can interact with an application that is executed on a server remote from the user device using a remote display protocol. The remote display protocol can be used to transfer the display data generated by the application for presentation on the user device. During execution and based on user input events from the user device, the application can generate updates to the display data, and the remote display protocol can be used to transfer the updated display data to the remote client.

A virtual machine (VM) is a software-based abstraction of a physical computer system. A VM is executed on a physical computer through the use of virtualization software typically referred to as a "hypervisor." A physical computer system, also referred to as a host machine, can execute one or more VMs. The hypervisor is software that is logically interposed between and interfaces with a VM and a physical computer system. In general, each VM is configured to execute an operating system, referred to herein as a guest OS, and applications.

SUMMARY

In general, one aspect of the subject matter described in this document can be embodied in a technique that includes receiving a first user request to access an application from a first user device, wherein the first user request includes information characterizing the first user device, wherein the application comprises a respective user interface code path corresponding to each of a plurality of user device classes, and wherein each user interface code path, when executed, generates a user interface that is specific to user devices of the corresponding user device class; classifying, using the information characterizing the first user device, the first user device into a first user device class of the plurality of user device classes; causing the application to generate a user interface by executing a first user interface code path corresponding to the first user device class; and providing the user interface for presentation on the first user device in response to the first user request.

These and other aspects can optionally include one or more of the following features. The aspect can further include: while the user interface is presented on the first user device: receiving data identifying a user event associated with the user interface; and providing the user event as an input to the application. The aspect can further include receiving a user interface update from the application; and providing the user interface update to the first user device. Each of the user device classes can be associated with respective criteria for display and input capabilities of user devices in the device class. The information characterizing the first user device can be information characterizing display and input capabilities of the first user device, and wherein classifying the first user device comprises determining that the display and input capabilities of the first user device satisfy the criteria for the first user device class. Causing the application to generate the user interface by executing the first user interface code path can include: identifying a first virtual machine assigned to a first user of the first user device; and causing an instance of the application in a first virtual machine assigned to the first user to generate the user interface by executing the first user interface code path. The aspect can further include receiving, from the first user, a request to switch to accessing the application on a second user device; classifying the second user device into a second, different user device class of the plurality of user device classes; causing the instance of the application to generate a second, different user interface by executing a second user interface code path corresponding to the second user device class; and providing the second user interface for presentation on the second user device. The aspect can further include continuing to provide the first user interface for presentation on the first user device while providing the second user interface for presentation on the second user device; while the first user interface is presented on the first user device and the second user interface is presented on the second user device, receiving data identifying user events associated with the first user interface from the first user device and data identifying user events associated with the second user interface from the second user device; and processing the user events associated with the first user interface and the user events associated with the second user interface atomically. The aspect can further include receiving a second user request to access the application from a second user device, wherein the request includes information characterizing the second user device; classifying, using the information characterizing the second user device, the second user device into a second, different user device class of the plurality of user device classes; causing the application to generate a second, different user interface by executing a second user interface code path corresponding to the second user device class; and providing the second user interface for presentation on the second user device in response to the second user request.

Particular embodiments of the subject matter described in this document can be implemented so as to realize one or more of the following advantages. By allowing applications to execute different code paths that generate different user interfaces for devices of different display size and with different input methods, the user experience can be improved by allowing users to interact with different user interfaces that are adapted to the display and input capabilities of their user devices. By remoting application user interfaces to user devices in this manner, simpler user devices that do not require as much processing power or storage capacity can be used by end users. Additionally, by using a single application having multiple user interface code paths, the user experience is improved by allowing the user to access the same centralized application data and session state from any of the user's devices while also being provided with a user interface tailored for the user device. Further, applications having multiple user interface code paths may be easily developed and maintained, e.g., because to allow the application to support an additional device class, only a new user interface code path corresponding to the additional device class needs to be developed. User interface designers may be afforded additional flexibility in designing user interfaces for an application by being able to tailor different user interfaces to different device classes.

The details of one or more embodiments of the subject matter described in this document are set forth in the accompanying drawings and the description below. Other features, aspects, and advantages of the subject matter will become apparent from the description, the drawings, and the claims.

DETAILED DESCRIPTION

This document generally describes a remote application system that allows users to interact with one or more applications managed by the system by providing user interface data generated by the applications for presentation to users. Generally, each of the applications managed by the system includes a respective set of user interface code paths. Each user interface code path corresponds to a respective user device class and, when executed, generates a user interface that is specific to user devices of the user device class. When the system receives a user request to access one of the applications that is managed by the system from a user device, the system classifies the user device into an appropriate user device class, e.g., using information received with the user request, and causes the application to generate a user interface by executing the user interface code path that corresponds to the appropriate user device class. The system then provides the user interface for presentation on the user device in response to the user request.

Figure 1:
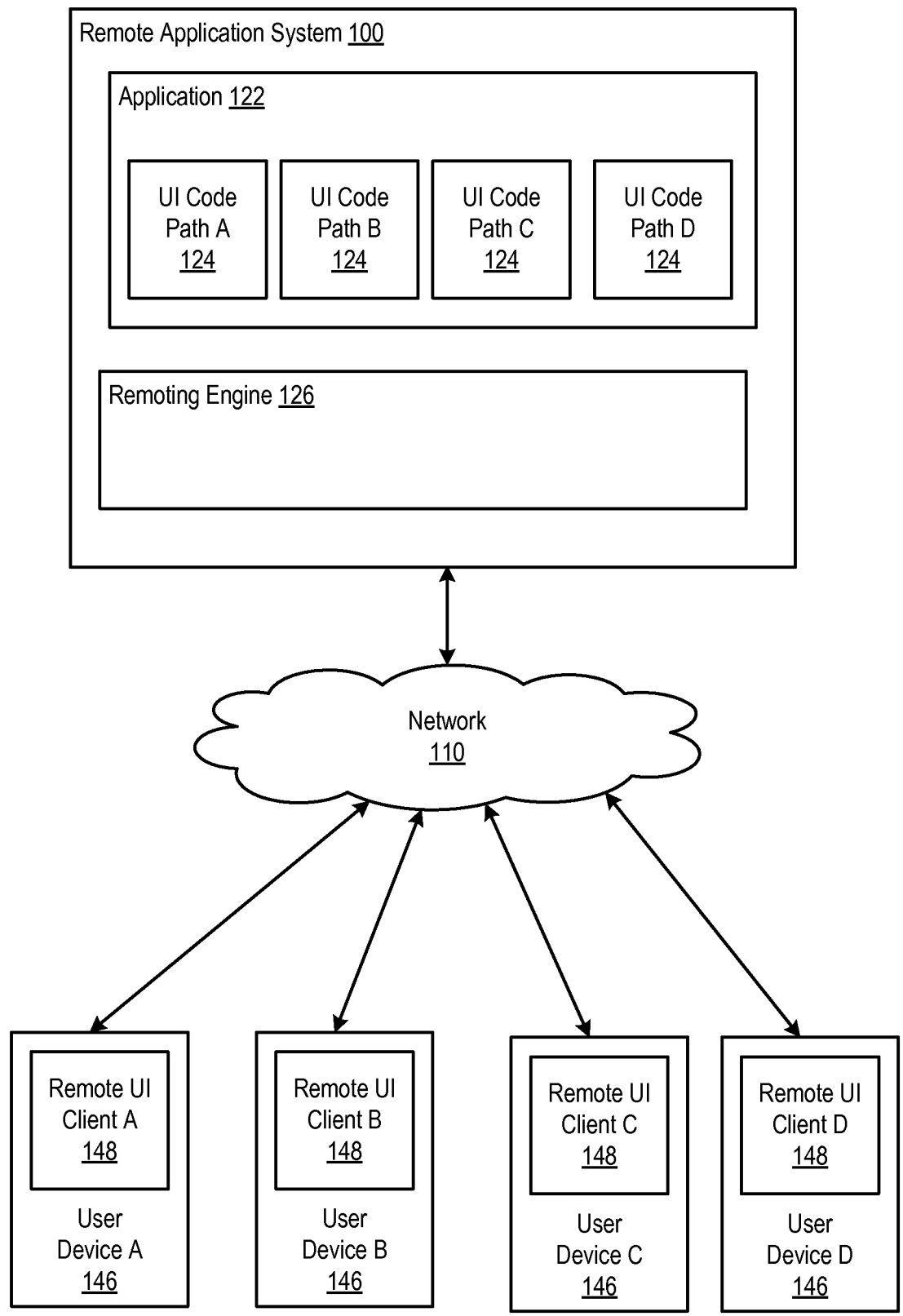
FIG. 1 shows an example remote application system.

FIG. 1 shows an example remote application system 100. The remote application system 100 is an example of a system implemented as computer programs on one or more computers in one or more locations, in which the systems, components, and techniques described below are implemented.

The remote application system 100 manages the execution of one or more applications and allows users of user devices remote from the remote application system 100 to access and interact with the applications managed by the remote application system 100 by providing user interfaces generated by the applications for presentation on the user devices over a network 110. The network 110 can be, e.g., a local area network (LAN), wide area network (WAN), e.g., the Internet, a cellular data network, or a combination thereof.

In order to allow the users to interact with the application, the remote application system 100 also receives data identifying user events associated with the presented user interfaces and transmits those user events to the applications executing on the remote application system 100. For example, the remote application system 100 can allow users of user devices 146 to access and interact with an application 122 executing on the remote application system 100.

The user devices 146 can be various user computers that have various display properties and that accept various user input modalities. For example, the user devices 146 can include mobile devices, e.g., smartphones and tablet computers, that accept touch input. The displays of the mobile devices can be of varying sizes and can display outputs at various display resolutions. The user devices 146 can also include desktop and laptop computers that accept keyboard and mouse input, network-connected televisions that accept user input using various types of remote controls, various of kinds of devices that accept voice input, and so on.

To account for the different display and input capabilities of different kinds of user devices, the application 122 includes multiple user interface code paths 124. Each of the user interface code paths 124, when executed, generates a user interface that is specific to a respective class of user devices. For example, one of the user interface code paths 124 may generate a user interface for user devices that accept touch input, that have displays of specified sizes, and that display output at a specified range of resolutions. A different one of the user interface code paths 124 may generate a user interface for user devices that accept keyboard and mouse input. A different one of the user interface code paths 124 may generate a user interface for user devices that accept voice input in addition to touch input.

In order to allow a user to interact with an application managed by the remote application system 100, each of the user devices 146 includes a respective remote user interface client 148 that users of the user device 146 can use to interact with the application 122 or with other applications executing on the remote application system 100. In some implementations, the remote user interface client 148 is a special-purpose process executing on the user device 146. In some other implementations, the remote user interface client 148 is a web browser executing on the user device 146.

In particular, a user of one of the user devices 146 can submit a request to the remote application system 100 through the remote user interface client 148 executing on the user device 146 to access the application 122. A remoting engine 126 in the remote application system 100 receives the request from the remote user interface client 148 to access the application 122, determines the device class that the requesting user device belongs to, and causes the application 122 to generate a user interface by executing the user interface code path 124 corresponding to the device class. Determining a device class that a user device belongs to and causing an application to generate a user interface are described in more detail below with reference to FIG. 3.

The remoting engine 126 then provides the user interface generated by the application 122 to the requesting user device for presentation to the user by the remote user interface client 148 executing on the user device 146. Generally, the remoting engine 126 transmits the user interface data to the remote user interface client 148 executing on the user device 146 using a remote display protocol. In some implementations, the remote display protocol is a pixel-level protocol e.g., the Blast protocol or the remote desktop protocol (RDP), that compresses, encrypts and transports image pixels to the remote user interface client 148 executing on the user device 146. The remote user interface client 148 in turn causes the user device 146 to decrypt, decompress, and display the image pixels. In some other implementations, the remoting engine 126 can provide the user interface data using a higher-level protocol. For example, the higher-level protocol may be a protocol that provides the user interface data using a page layout language with client-side scripting, e.g., a protocol that provides the user interface data in a hypertext markup language (HTML) document with Cascading Style Sheets (CSS) and JavaScript. As another example, the higher-level protocol may be a geometry-based protocol, e.g., a graphics device interface (GDI) protocol.

While the user interface is being displayed to the user, the remote user interface client 148 is configured to detect user events associated with the displayed user interface and provide data identifying the user events to the remoting engine 126. For example, the remote user interface client 148 can detect user events, e.g., a click or touch input on the user interface or a text input or voice command submitted by a user while the user interface is active on the user device, and provide data identifying the user events to the remoting engine 148, e.g., data identifying the location of the user event, the type of the user event, and other user event parameters.

Once the remoting engine 126 receives data identifying a user event, the remoting engine 126 provides the user event as input to the application 122. If the input causes a change to the user interface, the remoting engine 126 receives the updated user interface data from the application 122 and provides the updated user interface data for presentation to the user by the remote user interface client 148, e.g., using the remote display protocol.

The remote application system 100 may host the application 122 and allow users of the system to interact with the application 122 in any of a variety of ways. For example, the application 122 may be hosted in a virtual machine, on a Remote Desktop Session Host (RDSH) server, or in a container in a web server. As another example, the remote application system 100 may host the application 122 as a software as a service (SaaS) application, i.e., by hosting the application 122 on multiple servers that are fronted by a load balancer, with different instances of the application 122 serving different users.

In some implementations, the remote application system 100 maintains a designated instance of the application 122 for each user of the remote application system 100 in a virtual machine that is assigned to the user. For example, the remote application system 100 can assign a separate virtual machine to each user of the system, and in response to a request from a user to access the application 122, can allow the user to interact with an instance of the application 122 executing in the virtual machine assigned to the user.

Figure 2:
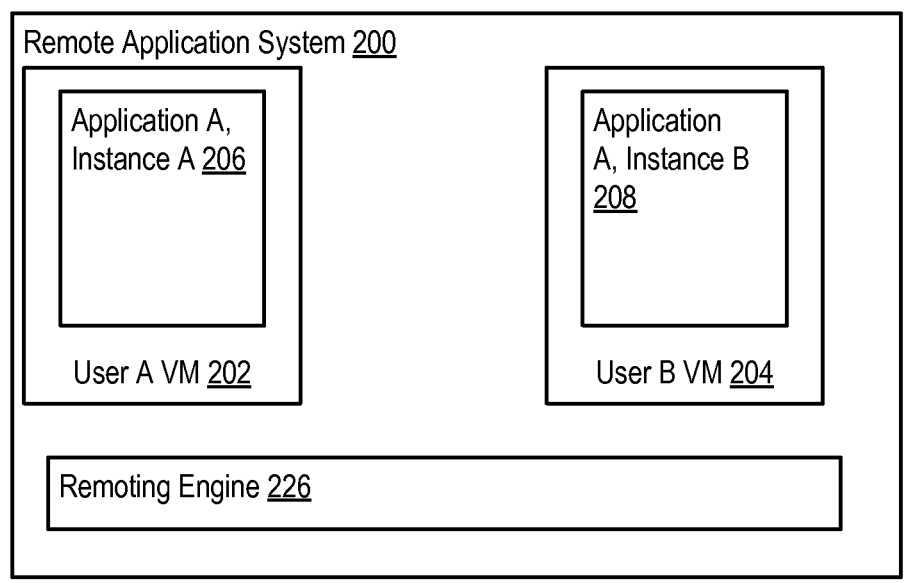
FIG. 2 shows an example remote application system that executes applications in user-specific virtual machines.

FIG. 2 shows an example remote application system 200 that executes applications in user-specific virtual machines. The remote application system 200 is an example of a system implemented as computer programs on one or more computers in one or more locations, in which the systems, components, and techniques described below are implemented.

The remote application system 200 executes a respective virtual machine, e.g., virtual machines 202 and 204, for each user of the remote application system 200. For example, the remote application system 200 may include one or more computers in one or more locations that each executes a hypervisor. Each hypervisor manages a virtual machine execution space within which one or more of the virtual machines are instantiated and executed.

In response to receiving a request from a user of a user device to access an application managed by the remote application system 200, a remoting engine 206 included in the remote application system 200 can determine an appropriate device type for the user device and cause the virtual machine for the user to launch an instance of the requested application in the virtual machine. As part of launching the instance, the remoting engine 206 causes the application instance to generate a user interface by executing the user interface code path that corresponds to the device class for the user device. Alternatively, rather than launching the instance of the application in response to the user request, the instance may already be executing in the virtual machine assigned to the user, and the remoting engine 206 can cause the already-executing instance to generate the user interface by executing the user interface code path that corresponds to the device class for the user device. By causing an already-executing instance to generate the user interface, the appropriate user interface can be provided to the user device rapidly and at a low latency.

The remoting engine 206 can then provide the user interface for presentation to the user on the user device, e.g., as described above with reference to FIG. 1. For example, the virtual machine 202 for a user A of the remote application system 200 can execute one instance 206 of an application A managed by the remote application system 200 while the virtual machine 204 for a user B of the remote application system 200 can execute a different instance 208 of the application A. In some cases, i.e., if the user device used by the user A belongs to a different device class than the user device used by the user B, the user interface code path executed by the instance 206 may be different from the user interface code path executed by the instance 208.

In some implementations, each of the virtual machines managed by the remote application system 200 can execute a respective remoting engine 206. That is, each of the virtual machines may execute a different instance of the remoting engine 206 that manages user access to the application instances executing in the virtual machine. For example, in response to receiving a request from the user A to log-in to an account of the user with the remote application system 200, the remote application system 200 can launch or resume the virtual machine 202 assigned to the user and launch or resume an instance of the remoting engine 206 in the virtual machine 202. The instance of the remoting engine 206 can then receive user requests to access applications managed by the remote application system 200 and process the user requests as described above.

Figure 3:
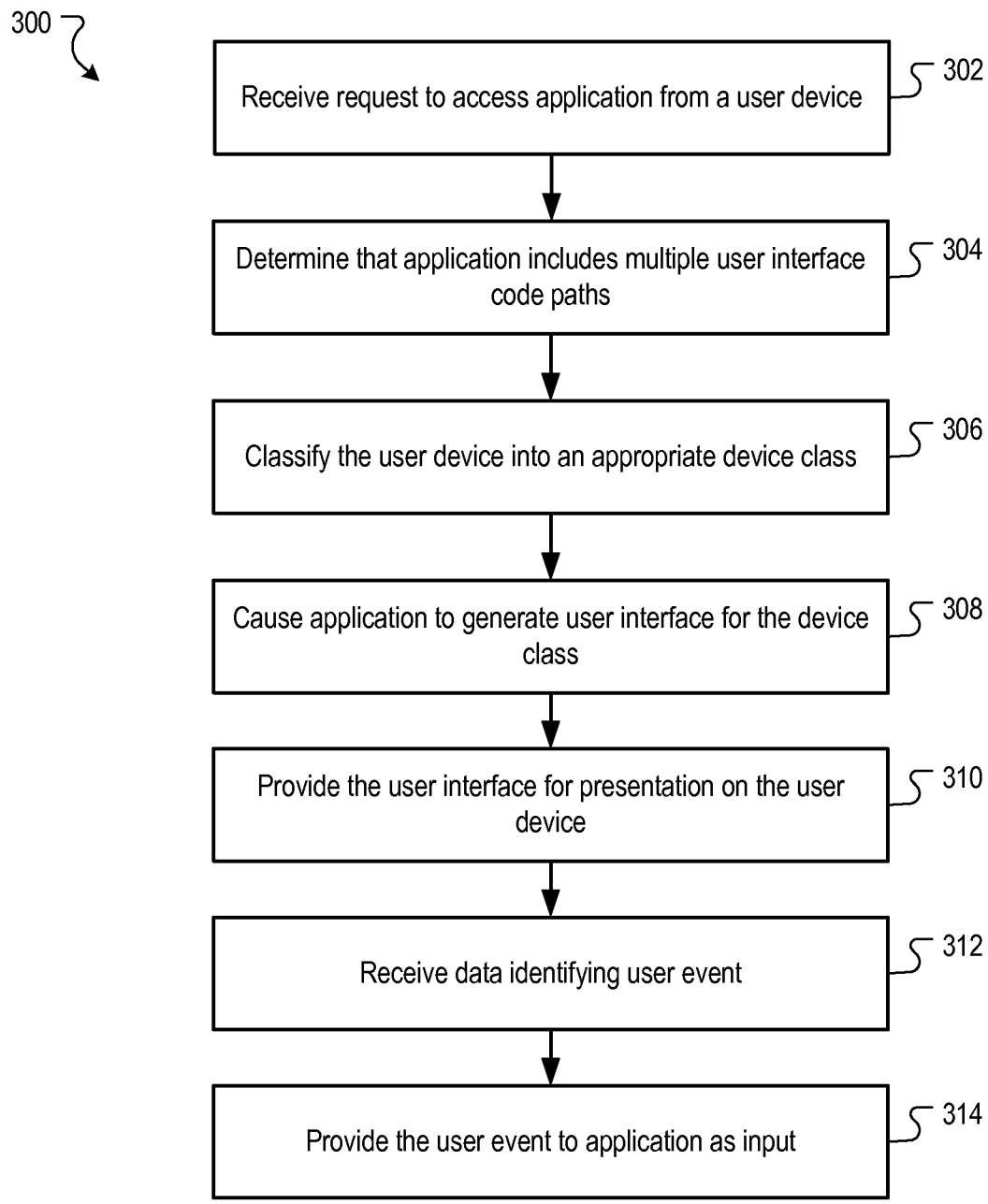
FIG. 3 is a flow chart of an example technique for providing a user interface generated by an application to a remote user device.

FIG. 3 is a flow chart of an example technique 300 for providing a user interface generated by an application to a remote user device. The example technique 300 is performed by a system of one or more computers. For example, the technique 300 may be performed by a remote application system, e.g., the remote application system 100 of FIG. 1 or the remote application system 200 of FIG. 2.

The system receives a request to access an application managed by the system from a user device (step 302). For example, the request can be received by the system from a remote user interface client executing on the user device, e.g., one of the remote user interface clients 148 executing on one of the user devices 146 of FIG. 1. The request identifies the application to be launched and includes identifying information that characterizes the user device. In particular, the remote user interface client can be configured to detect identifying information about the user device and provide the identifying information to the system with the request. The identifying information can include the device type of the user device, e.g., mobile phone, tablet, laptop computer, desktop computer, television, and so on, and the input styles accepted by the user device, e.g., touch input, mouse input, keyboard input, infrared (IR) remote, voice input, and so on. The identifying information can also include information characterizing the display of the user device, e.g., the size of the display, e.g., the x and y dimensions of the display, and the resolution of the display.

The system determines that the application includes a respective user interface code path for each of a set of device classes (step 304). Generally, each of the device classes is associated with one or more of device type criteria, display criteria, or input style criteria. The device type criteria specify acceptable device types for user devices belonging to the device class. For example, the device type criteria may specify that mobile phones, tablets, or both are acceptable device types for user devices in the device class. The display criteria specify acceptable display sizes, e.g., ranges of one or more display sizes in inches or centimeters, and acceptable display resolutions, e.g., ranges of one or more resolutions in pixels per inch or pixels per centimeter, for user devices belonging to the device class. The input style criteria specify acceptable input styles for user devices belonging to the device class.

In some implementations, each application managed by the system includes a respective code path for each of a predetermined set of device classes. In some other implementations, however, different applications managed by the system may have different numbers of code paths for different device classes. For example, one application may include one code path for laptop computers and a different code path for desktop computers. A different application, however, may include a single code path for all user devices that accept keyboard and mouse input.

The system classifies the user device into an appropriate device class using the identifying information received with the request (step 306). That is, the system classifies the user device into one of the device classes for which the application includes a user interface code path using the identifying information received with the request. In particular, the system determines a device class for which the user device satisfies each of the criteria, e.g., the device type criteria, the display size criteria, or the input style criteria, based on the identifying information for the user device.

The system causes the application to generate a user interface by executing the user interface code path corresponding to the appropriate device class for the user device (step 308). For example, in implementations where the application executes in a virtual machine assigned to the user, the system can launch an instance of the application in the virtual machine assigned to the user from whom the request was received and cause the application instance to execute the code path corresponding to the appropriate class.

The system provides the user interface generated by the application for presentation on the user device (step 310). For example, the system can provide the user interface for presentation by the remote user interface client executing on the user device.

While the user interface is being presented on the user device, the system receives data identifying a user event associated with the user interface (step 312). That is, the remote user interface client executing on the user device is configured to identify user events, e.g., mouse clicks, keyboard key presses, swipes, double taps, audio, gestures, biometrics, fingerprints, temperature, humidity, gyroscopic motion, global positioning system information, camera/microphone capture or other user interactions with the user interface and provide the user events to the system. The user event can identify, e.g., the specific input and a location of the input.

The system provides the user event as an input to the application (step 314). In some cases, the user input may cause a change in the user interface generated by the application. In these cases, the system can provide user interface updates to the user device that cause the user device to display the updated user interface. The system can repeat steps 312 and 314 for each subsequent user interaction received by the system while the user interface is being presented on the user device.

In some cases, a user event may cause a change in the identifying information for the user device. For example, the user may submit an input changing the orientation of the display, e.g., by turning a mobile device or a tablet. As another example, the user may submit an input changing the size of a user interface window in which the user interface data is displayed, e.g., by submitting a touch input on a touchscreen display or by using a mouse to resize the user interface window. In these cases, the system can receive data identifying the user event and determine whether the user event has caused a different device class to be appropriate for the user device and, if so, cause the application to switch to executing the user interface code path corresponding to the different device class. If not, the system can rescale the user interface data generated by the user device so that it is appropriate for a user device having the changed identifying information.

In some cases, while the user is interacting with an application managed by the system on one device, the user may desire to switch to another device of a different device class to continue interacting with the application. For example, a user interacting with the application on a mobile device may desire to continue interacting with the application on a network-connected television or on a laptop or desktop computer, e.g., to take advantage of the increased display size of the other user devices.

Figure 4:
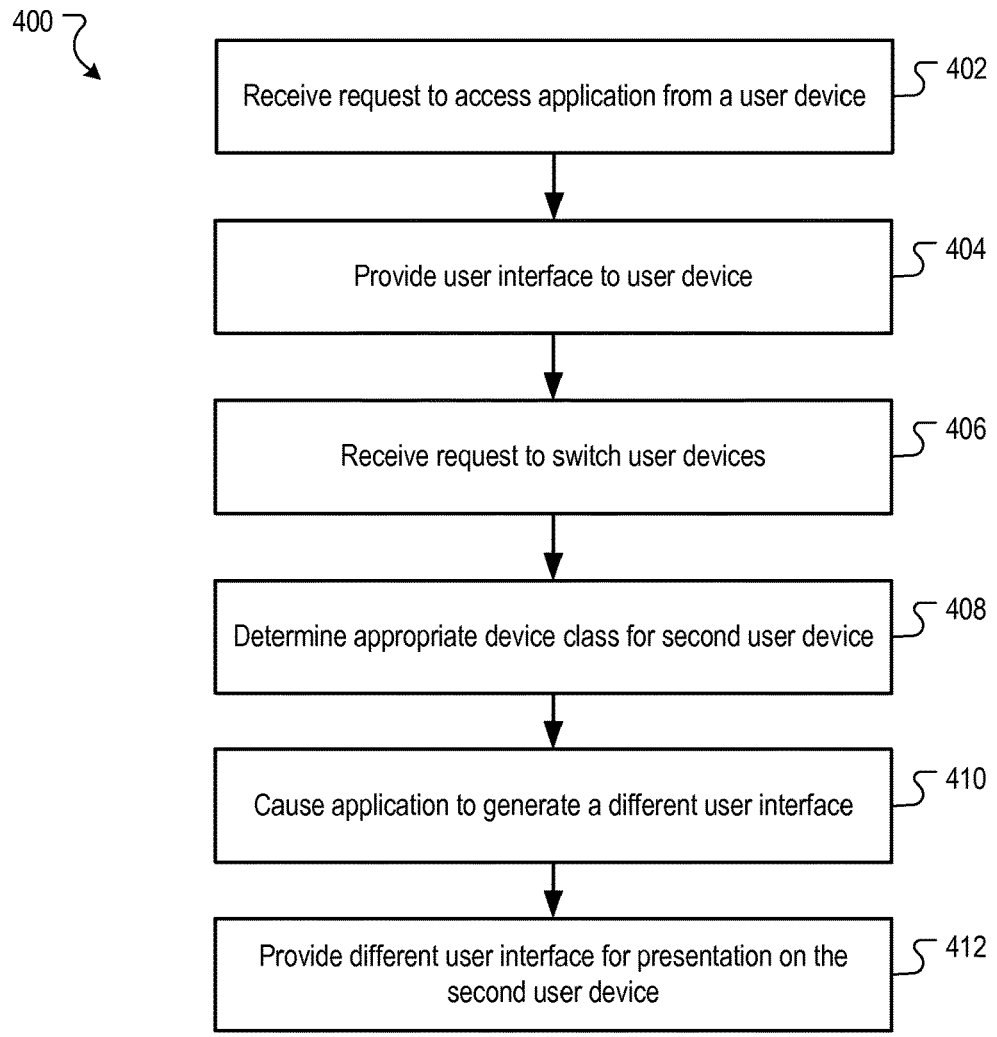
FIG. 4 is a flow chart of an example technique for allowing a user to switch from one user device to another user device while accessing a remote application Like reference numbers and designations in the various drawings indicate like elements.

FIG. 4 is a flow diagram of an example process 400 for allowing a user to switch from one user device to another user device while accessing a remote application. The example technique 300 is performed by a system of one or more computers. For example, the technique 300 may be performed by a remote application system, e.g., the remote application system 100 of FIG. 1 or the remote application system 200 of FIG. 2.

The system receives a request to access an application from a first user device (step 402).

The system provides a user interface generated by a first code path of the application to the first user device (step 404). That is, the system determines an appropriate code path for the user device and provides the user interface for presentation as described above with reference to FIG. 3.

The system receives a request to switch to accessing the application from a second user device (step 406). For example, the system may receive an input from a remote user interface client on the second user device requesting to access the application while the user interface is being presented on the first user device. In some implementations, in response to receiving the input, the system can cause the remote user interface client on the second user device to prompt the user to determine whether the user would like to switch the ongoing session to the second user device or start a new session on the user device.

In some implementations, the application maintains a device-independent state for the user and, once a user is authenticated into a session with the system on the second user device, the applications being accessed by the user during the session on the first user device can automatically be resumed on the second user device using the maintained state for the user. That is, the system can interpret the initiation of a new user session on the second user device as a request to switch to accessing the application from the second user device using the state information maintained in the device-independent state.

The system determines an appropriate device class for the second user device from the device classes for which the application has a corresponding user interface code path (step 408). That is, the system classifies the second user device into an appropriate device class from information identifying the second user device received from the user device with the request to switch to accessing the application from the second user device.

The system causes the application to generate a different user interface by executing the user interface code path corresponding to the appropriate device class for the second user device (step 410). If a device-independent state is maintained for the user, the user interface code path can be generated using the information in the device-independent state, allowing for a seamless transition from the first user device to the second user device for the user.

The system provides the different user interface for presentation on the second user device (step 412). In some implementations, once the different user interface has been provided for presentation, the system stops executing the user interface code path that generated the user interface that was presented on the first user device and stops providing user interface data for presentation on the first user device. In some other implementations, the system can execute multiple user interface code paths in parallel to generate multiple user interfaces that are presented on multiple user devices. In some implementations, the system allows the user to designate one of the executing code paths as the primary code path. In these implementations, the system designates executing code paths other than the primary code path as passive code paths and prevents the user from submitting inputs to the application through the user interfaces generated by the passive code paths. Thus, only the user interface generated by the primary code path can be used to submit inputs to the application. In some other implementations, the system can allow inputs to the application to be submitted using multiple executing code paths. For example, a user viewing a photo slide show on a tablet and on a television may be able to submit photo editing inputs through both the user interface on the tablet and the user interface on the television, e.g., by applying a global color correction function through the television user interface and applying a brush precision editing function through the tablet interface, with both displays showing the edited photo. In these implementations, the system processes user inputs received from different user devices atomically, i.e., so that one user input is processed completely by the application before the next one is provided to the application.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, from a first user device, a first user request to access an application configured to execute remotely from the first user device by a virtual machine, wherein information detected by a remote user interface client, executing on the first user device, that characterizes one or more parameters of the first user device, including one or more of accepted input styles or physical display characteristics of the first user device, is sent by the remote user interface client with the first user request,
      wherein the application comprises a plurality of user interface code paths including a respective user interface code path corresponding to each of a plurality of user device classes, and
      wherein each user interface code path comprises code that, when executed by the application from the virtual machine, causes the application to generate a user interface for the application that is specific to user devices of the corresponding user device class;
   classifying, using the information characterizing the first user device, the first user device into a first user device class of the plurality of user device classes;
   causing the application to execute on the virtual machine including generating a user interface for the application by executing a first user interface code path of the plurality of user interface code paths, wherein the first user interface code path is one of the plurality of user interface code paths of the application that corresponds to the first user device class; and
   providing the generated user interface generated by the application on the virtual machine executing the first user interface code path to the first user device for presentation by the remote user interface client in response to the first user request.

2. The method of claim 1, further comprising:
   while the user interface is presented on the first user device:
      receiving data identifying a user event associated with the user interface; and
      providing the user event as an input to the application.

3. The method of claim 2, further comprising:
receiving a user interface update from the application; and
providing the user interface update to the first user device.

4. The method of claim 1, wherein each of the user device classes is associated with respective criteria for display and input capabilities of user devices in the device class.

5. The method of claim 4, wherein the information characterizing the first user device is information characterizing display and input capabilities of the first user device, and wherein classifying the first user device comprises determining that the display and input capabilities of the first user device satisfy the criteria for the first user device class.

6. The method of claim 1, wherein causing the application to generate the user interface by executing the first user interface code path comprises:
identifying a first virtual machine assigned to a first user of the first user device; and
causing an instance of the application in a first virtual machine assigned to the first user to generate the user interface by executing the first user interface code path.

7. The method of claim 6, further comprising:
receiving, from the first user, a request to switch to accessing the application on a second user device;
classifying the second user device into a second, different user device class of the plurality of user device classes;
causing the instance of the application to generate a second, different user interface by executing a second user interface code path corresponding to the second user device class; and
providing the second user interface for presentation on the second user device.

8. The method of claim 7, further comprising:
continuing to provide the first user interface for presentation on the first user device while providing the second user interface for presentation on the second user device;
while the first user interface is presented on the first user device and the second user interface is presented on the second user device, receiving data identifying user events associated with the first user interface from the first user device and data identifying user events associated with the second user interface from the second user device; and
processing the user events associated with the first user interface and the user events associated with the second user interface atomically.

9. The method of claim 1, further comprising:
receiving a second user request to access the application from a second user device, wherein the request includes information characterizing the second user device;
classifying, using the information characterizing the second user device, the second user device into a second, different user device class of the plurality of user device classes;
causing the application to generate a second, different user interface by executing a second user interface code path corresponding to the second user device class; and
providing the second user interface for presentation on the second user device in response to the second user request.

10. A system comprising one or more computers and one or more storage devices storing instructions that when executed by the one or more computers cause the one or more computers to perform operations comprising:
receiving, from a first user device, a first user request to access an application configured to execute remotely from the first user device by a virtual machine, wherein information detected by a remote user interface client, executing on the first user device, that characterizes one or more parameters of the first user device, including one or more of accepted input styles or physical display characteristics of the first user device, is sent by the remote user interface client with the first user request,
wherein the application comprises a plurality of user interface code paths including a respective user interface code path corresponding to each of a plurality of user device classes, and
wherein each user interface code path comprises code that, when executed by the application from the virtual machine, causes the application to generate a user interface for the application that is specific to user devices of the corresponding user device class;
classifying the first user device into a first user device class of the plurality of user device classes;
causing the application to execute on the virtual machine including generating a user interface for the application by executing a first user interface code path of the plurality of user interface code paths, wherein the first user interface code path is one of the plurality of user interface code paths of the application that corresponds to the first user device class; and
providing the generated user interface generated by the application on the virtual machine executing the first user interface code path to the first user device for presentation by the remote user interface client in response to the first user request.

11. The system of claim 10, the operations further comprising:
while the user interface is presented on the first user device:
receiving data identifying a user event associated with the user interface; and
providing the user event as an input to the application.

12. The system of claim 11, the operations further comprising:
receiving a user interface update from the application; and
providing the user interface update to the first user device.

13. The system of claim 10, wherein each of the user device classes is associated with respective criteria for display and input capabilities of user devices in the device class.

14. The system of claim 13, wherein the request includes information characterizing the first user device, and wherein the information characterizing the first user device is information characterizing display and input capabilities of the first user device, and wherein classifying the first user device comprises determining that the display and input capabilities of the first user device satisfy the criteria for the first user device class.

15. The system of claim 10, wherein causing the application to generate the user interface by executing the first user interface code path comprises:
identifying a first virtual machine assigned to a first user of the first user device; and
causing an instance of the application in a first virtual machine assigned to the first user to generate the user interface by executing the first user interface code path.

16. The system of claim 15, the operations further comprising:
receiving, from the first user, a request to switch to accessing the application on a second user device;
classifying the second user device into a second, different user device class of the plurality of user device classes;

causing the instance of the application to generate a second, different user interface by executing a second user interface code path corresponding to the second user device class; and providing the second user interface for presentation on the second user device.

17. The system of claim 16, the operations further comprising:

continuing to provide the first user interface for presentation on the first user device while providing the second user interface for presentation on the second user device;

while the first user interface is presented on the first user device and the second user interface is presented on the second user device, receiving data identifying user events associated with the first user interface from the first user device and data identifying user events associated with the second user interface from the second user device; and processing the user events associated with the first user interface and the user events associated with the second user interface atomically.

18. The system of claim 10, the operations further comprising:

receiving a second user request to access the application from a second user device;

classifying the second user device into a second, different user device class of the plurality of user device classes;

causing the application to generate a second, different user interface by executing a second user interface code path corresponding to the second user device class; and providing the second user interface for presentation on the second user device in response to the second user request.

19. A computer storage medium encoded with a computer program, the computer program comprising instructions that when executed by the one or more computers cause the one or more computers to perform operations comprising:

receiving, from a first user device, a first user request to access an application configured to execute remotely from the first user device by a virtual machine, wherein information detected by a remote user interface client, executing on the first user device, that characterizes one or more parameters of the first user device, including one or more of accepted input styles or physical display characteristics of the first user device, is sent by the remote user interface client with the first user request, wherein the application comprises a plurality of user interface code paths including a respective user interface code path corresponding to each of a plurality of user device classes, and wherein each user interface code path comprises code that, when executed by the application from the virtual machine, causes the application to generate a user interface for the application that is specific to user devices of the corresponding user device class;

classifying, using the information characterizing the first user device, the first user device into a first user device class of the plurality of user device classes;

causing the application to execute on the virtual machine including generating a user interface for the application by executing a first user interface code path of the plurality of user interface code paths, wherein the first user interface code path is one of the plurality of user interface code paths of the application that corresponds to the first user device class; and providing the generated user interface generated by the application on the virtual machine executing the first user interface code path to the first user device for presentation by the remote user interface client in response to the first user request.

20. The computer storage medium of claim 19, the operations further comprising:

receiving a second user request to access the application from a second user device, wherein the request includes information characterizing the second user device;

classifying, using the information characterizing the second user device, the second user device into a second, different user device class of the plurality of user device classes;

causing the application to generate a second, different user interface by executing a second user interface code path corresponding to the second user device class; and providing the second user interface for presentation on the second user device in response to the second user request.

* * * * *